E. M. PEACOCK.
MILK CAN.
APPLICATION FILED SEPT. 15, 1911.
1,013,810.
Patented Jan. 2, 1912.
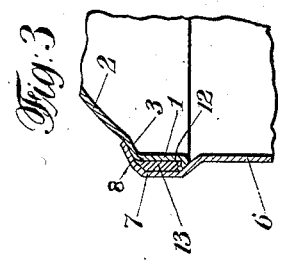
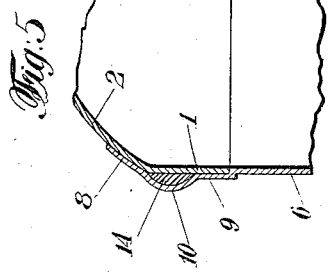
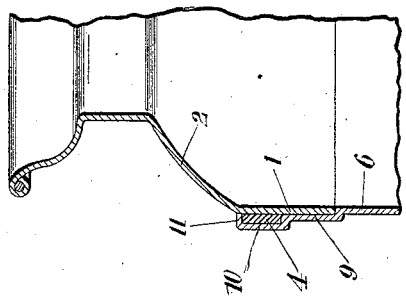
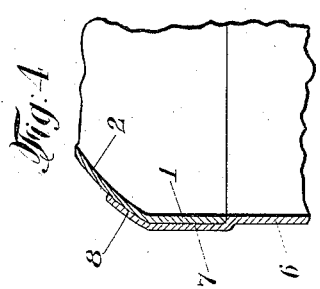
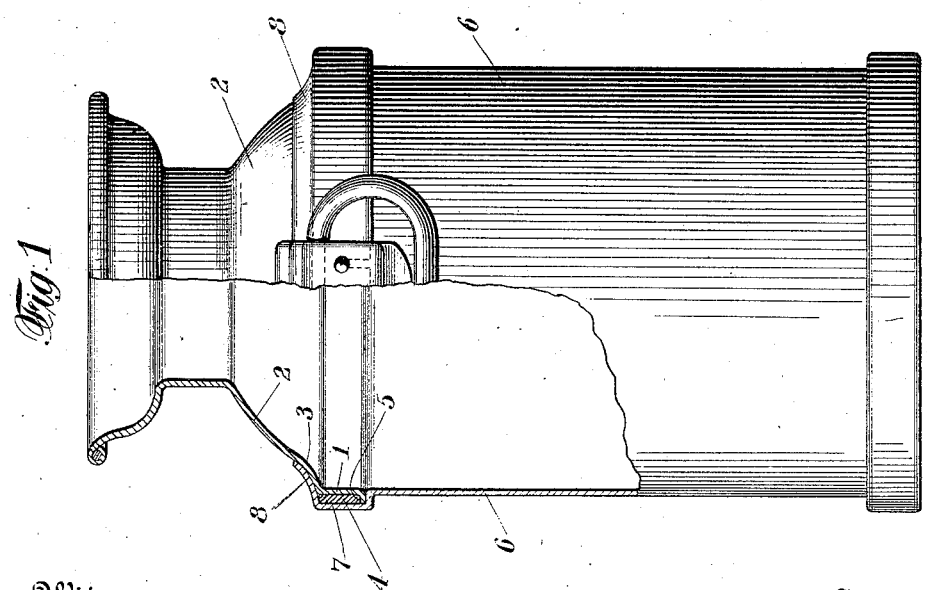
Witnesses:
Inventor
Edward M. Peacock
By his Attorney

UNITED STATES PATENT OFFICE.

EDWARD M. PEACOCK, OF JERSEY CITY, NEW JERSEY, ASSIGNOR TO DAIRYMEN'S MANUFACTURING COMPANY, A CORPORATION OF NEW YORK.

MILK-CAN.

1,013,810.   Specification of Letters Patent.   Patented Jan. 2, 1912.

Application filed September 15, 1911. Serial No. 649,558.

*To all whom it may concern:*

Be it known that I, EDWARD M. PEACOCK, a citizen of the United States, residing at Jersey City, in the county of Hudson and State of New Jersey, have invented certain new and useful Improvements in Milk-Cans, of which the following is a specification, reference being had therein to the accompanying drawings, forming part thereof.

My invention relates to milk cans and similar vessels, and has for general objects the provision of a can which will be simple and inexpensive to manufacture and which will be durable and sanitary.

More specifically, my invention has for an object to provide strong joints capable of withstanding the hard usage to which milk cans are subjected.

Another object is to so interlock the members which are joined together as to form a housing for reinforcing hoops and to provide smooth flush joints on the inside of the can.

Still other objects and advantages of my invention will appear from the following description.

In its broad aspect my invention comprehends the combination of a cylindrical body and a member joined thereto having a cylindrical portion extending into the body, the body having an annular offset fitting over the said cylindrical portion and forming a flush joint on the inside of the can.

More specifically my invention comprehends an offset on the body terminating in an inwardly turned flange overlapping the complementary member.

My invention also comprehends a reinforcing hoop surrounding the said cylindrical portion and housed within the offset on the body, the inwardly turned flange locking over the hoop.

My invention further comprehends an externally projecting annular flange on the complementary member, the reinforcing hoop being locked between the two flanges.

My invention also includes various other features of construction and combinations of parts as will hereinafter more fully appear.

I shall now describe the embodiments of my invention illustrated in the accompanying drawings and shall thereafter point out my invention in claims.

Figure 1 is a view partly in elevation and partly in central vertical section, of a milk can embodying my invention. Figs. 2, 3, 4 and 5 are vertical sectional details of parts of cans embodying different modifications of my invention.

In the embodiments of my invention which are shown and are hereinafter described, my invention is adapted to the connections between the bodies and breasts of milk cans, but it will be understood that my broad invention is applicable to other sheet metal vessels and to other joints in sheet metal vessels, such as the joints between the bodies and bottoms thereof.

In the embodiment of my invention illustrated in Fig. 1, the breast of the can has a cylindrical depending portion 1 surmounted by a frusto-conical portion 2, at the lower end of which is an annular concave portion 3. Surrounding the cylindrical portion 1 is a reinforcing hoop 4, and the cylindrical portion 1 terminates at its lower end in an outwardly extending lip or flange 5 which bears underneath the hoop 4. The cylindrical body 6 of the can is of the same diameter as the cylindrical portion 1 of the breast and is provided on its upper end with an offset 7 which fits over the flange 5 and hoop 4 and terminates at its upper end in an inwardly turned flange 8 locking over the top of the hoop 4 and overlapping the concave portion 3 of the breast. A flush, smooth, sanitary joint is thus provided on the inside of the can between the body 6 and cylindrical portion 1, and a simple and a convenient housing is provided for the hoop 4. Furthermore, the conforming of the flange 8 to the concavity 3 augments the grip of the flange 8 upon the frusto-conical portion of the breast, and all of the features combine to make an extremely strong and durable joint.

In the embodiment of my invention illustrated in Fig. 2, the cylindrical portion 1 of the breast, instead of terminating in the outwardly turned flange 5, extends straight down into the body 6 which is provided at its upper end with a double offset, the lower portion 9 of which fits over the bottom of the cylindrical portion 1 of the breast, making a flush joint on the inside of the can, and the upper portion 10 of which houses the hoop 4 and terminates in an inwardly turned flange 11 which merely locks over the top of the hoop 4, but does not overlap the frusto-conical portion 2 of the breast.

In this construction the concavity 3 is omitted.

In the construction shown in Fig. 3, the cylindrical portion 1 of the breast terminates in an outwardly and upwardly turned flange 12 shaped to conform to the reinforcing hoop 13, the outer face of which is narrower than its inner face, and as a consequence the edges of the hoop flare outwardly. The offset 7 on the upper end of the body 6 is shaped accordingly and fits over the flange 12 and hoop 13 and terminates in an inwardly turned flange 8 shaped to lock over the hoop 13 and overlap the concave portion 3 of the frusto-conical portion of the breast.

In the construction illustrated in Fig. 4, a reinforcing hoop is omitted and the offset 7 on the body 6 is so shaped as to merely fit over the cylindrical depending portion 1 of the breast, which extends straight down into the body of the can. The offset 7 thus leaves a flush joint on the inside of the can, and on its upper end is provided with the inwardly turned flange 8 which overlaps the bottom of the frusto-conical portion 2 of the breast from which the concavity is omitted.

The construction illustrated in Fig. 5 differs from that shown in Fig. 4 only in the inclusion of a reinforcing hoop 14, which is shown as half round or semi-circular in cross-section. As in Fig. 2, a double offset is therefore provided, and the inwardly turned flange 8 locks the joint.

The joints at the outside and inside of the can are soldered and smoothed off in the usual way, and a strong, durable and sanitary can is thus produced.

It will be noted that the disposition of the internal joint on the side of the can below the top of the cylindrical body renders the joint much easier to clean than joints located in angles at the ends of the body.

It is obvious that various modifications may be made in the constructions shown and above particularly described within the principle and scope of my invention.

I claim:

1. In a milk can or the like, a breast including a cylindrical portion surmounted by a frusto-conical portion, and a cylindrical body having an annular offset at its upper end fitting over the cylindrical portion of the breast and having an inwardly turned flange at the top of the offset, the offset making a flush joint on the inside of the can between the walls of the body and of the cylindrical portion of the breast below the top of the cylindrical body.

2. In a milk can or the like, a breast including a cylindrical portion surmounted by a frusto-conical portion, and a cylindrical body having an annular offset at its upper end fitting over the cylindrical portion of the breast and having an inwardly turned flange at the top of the offset fitting over the bottom of the frusto-conical portion of the breast, the offset making a flush joint on the inside of the can between the walls of the body and of the cylindrical portion of the breast below the top of the cylindrical body.

3. In a milk can or the like, a breast including a cylindrical portion surmounted by a frusto-conical portion, a reinforcing hoop surrounding the cylindrical portion of the breast, and a cylindrical body having an annular offset at its upper end fitting over the cylindrical portion of the breast and over the reinforcing hoop and terminating in a flange at the top of the offset inwardly turned over the top of the reinforcing hoop, the offset making a flush joint on the inside of the can between the walls of the body and of the cylindrical portion of the breast.

4. In a milk can or the like, a breast including a cylindrical portion surmounted by a frusto-conical portion, a reinforcing hoop surrounding the cylindrical portion of the breast, and a cylindrical body having an annular offset at its upper end fitting over the cylindrical portion of the breast and over the reinforcing hoop and terminating in a flange at the top of the offset inwardly turned over the top of the reinforcing hoop and overlapping the bottom of the frusto-conical portion of the breast, the offset making a flush joint on the inside of the can between the walls of the body and of the cylindrical portion of the breast.

5. In a milk can or the like, a breast including a cylindrical portion having an outwardly turned flange at its bottom and surmounted by a frusto-conical portion, a reinforcing hoop surrounding the cylindrical portion of the breast and resting on the outwardly turned flange, and a cylindrical body having an annular offset at its upper end fitting over the cylindrical portion of the breast and terminating in an inwardly turned flange locking over the top of the reinforcing hoop, the offset making a flush joint on the inside of the can between the walls of the body and of the cylindrical portion of the breast.

6. In a milk can or the like, a breast including a cylindrical portion having an outwardly turned flange at its bottom and surmounted by a frusto-conical portion, a reinforcing hoop surrounding the cylindrical portion of the breast and resting on the outwardly turned flange, and a cylindrical body having an annular offset at its upper end fitting over the cylindrical portion of the breast and terminating in an inwardly turned flange locking over the top of the reinforcing hoop and overlapping the bottom of the frusto-conical portion of the breast, the offset making a flush joint on the inside of the can between the walls of the body and of the cylindrical portion of the breast.

7. In a milk can or the like, a breast including a cylindrical portion surmounted by a frusto-conical portion having an annular concavity at the lower end thereof, and a cylindrical body having an annular offset at its upper end fitting over the cylindrical portion of the breast and terminating in an inwardly turned flange fitting over the concaved portion of the breast, the offset making a flush joint on the inside of the can between the walls of the body and of the cylindrical portion of the breast.

8. In a milk can or the like, a breast including a cylindrical portion surmounted by a frusto-conical portion having an annular concavity at the lower end thereof, a reinforcing hoop surrounding the cylindrical portion of the breast, and a cylindrical body having an annular offset at its upper end fitting over the cylindrical portion of the breast and over the reinforcing hoop and terminating in an inwardly turned flange locking over the top of the reinforcing hoop and fitting over the concaved portion of the breast, the offset making a flush joint on the inside of the can between the walls of the body and of the cylindrical portion of the breast.

9. In a milk can or the like, the combination with a cylindrical body of a member joined thereto, the latter member having a cylindrical portion extending into the body, and the body having an annular offset portion fitting over the said cylindrical portion and making a flush joint on the inside of the can between the walls of the body and of the said cylindrical portion, the joint being disposed between the ends of the body.

10. In a milk can or the like, the combination with a cylindrical body of a member joined thereto, the latter member having a cylindrical portion extending into the body, and the body having an annular offset portion fitting over the said cylindrical portion and terminating in an inwardly turned flange overlapping the complementary member, the offset making a flush joint on the inside of the can between the walls of the body and of the said cylindrical portion, the joint being disposed between the ends of the body.

11. In a milk can or the like, the combination with a cylindrical body of a member joined thereto, the latter member having a cylindrical portion extending into the body and terminating in an outwardly turned flange, the body portion having an annular offset extending over the said cylindrical portion and terminating in an inwardly turned flange and making a flush joint on the inside of the can between the walls of the body and of the said cylindrical portion, and a reinforcing hoop surrounding the said cylindrical portion and fitting between the two said flanges.

In testimony whereof I have affixed my signature in presence of two witnesses.

EDWARD M. PEACOCK.

Witnesses:
 JACOB B. CONOVER,
 CHAS. F. DREYER.

---

Copies of this patent may be obtained for five cents each, by addressing the "Commissioner of Patents, Washington, D. C."